United States Patent
Madan

(10) Patent No.: US 7,543,187 B1
(45) Date of Patent: Jun. 2, 2009

(54) METHOD TO DYNAMICALLY FILTER ACTIVE SYSTEM STATE (LIVE DUMP) DATA

(75) Inventor: Gunisha Madan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/132,904

(22) Filed: Jun. 4, 2008

(51) Int. Cl.
*G06F 11/00* (2006.01)

(52) U.S. Cl. .................. 714/37; 714/38; 714/1
(58) Field of Classification Search .......... 714/37–39
See application file for complete search history.

(56) References Cited

U.S. PATENT DOCUMENTS

| | | | |
|---|---|---|---|
| 7,058,927 B2 | 6/2006 | Yenne et al. | |
| 7,107,497 B2 * | 9/2006 | McGuire et al. | 714/48 |
| 7,437,524 B2 | 10/2008 | Narayan et al. | |
| 2001/0032305 A1 | 10/2001 | Barry | |
| 2003/0167421 A1 | 9/2003 | Klemm | |
| 2003/0217130 A1 | 11/2003 | Tang et al. | |
| 2005/0102578 A1 | 5/2005 | Bliss et al. | |
| 2006/0075299 A1 | 4/2006 | Chandramouleeswaran et al. | |
| 2006/0208872 A1 | 9/2006 | Yu et al. | |

\* cited by examiner

*Primary Examiner*—Robert Beausoliel
*Assistant Examiner*—Charles Ehne
(74) *Attorney, Agent, or Firm*—Locke Lord Bissell & Liddell LLP

(57) ABSTRACT

A method for capturing the state of a running computer system for the purpose of performing debugging or some other analysis involves registering a user-customized filter function with the computer system's kernel, passing internal objects in the computer system through the filter-function, and capturing only internal objects satisfying the filter function. The filter function filters one or more categories of internal objects in a single serialized pass and is installed into a kernel extension, the kernel extension comprises a module capable of being loaded onto and unloaded from a running computer system, and the kernel is programmed to capture internal objects in the computer system.

1 Claim, 1 Drawing Sheet

METHOD TO DYNAMICALLY FILTER ACTIVE SYSTEM STATE (LIVE DUMP) DATA

BACKGROUND

In order to perform debugging analysis, crash analysis or some other for of analysis on the internal state of computer system, a snapshot of the state of a computer system is usually required. System captures, or "dumps", of the internal state of a computer system can be a critical step in the diagnoses of failures. A system capture often involves capturing the internal objects of the computer system, or in certain cases, the computer's kernel, yet they also typically require rebooting the system. For many commercial and business environments, which need to perform a specified analysis on a portion of their computer system, shutting down and rebooting wastes time, consumes resources and can be commercially infeasible.

Therefore, for very large computer systems, live dump programs that do not require reboot present two problems. First, capturing an entire system, which is very large, takes too much time, and for certain customer environments, that can be neither practical nor cost-efficient. Second, live dump programs typically have space-constraints, which restricts the amount of internal objects it can capture in a single serialized pass. Thus, capturing the entire system in one pass cannot be done. Rather, multiple passes are necessary to capture the entire system. A live dump capture performed over several passes, however, will result in inconsistent information because internal objects will have changed between passes. Live dump programs cannot therefore capture a system as it existed at a single point in time. This inhibits a user's ability to perform debugging.

SUMMARY

The foregoing problems are addressed by a method for capturing the state of a running computer system for the purpose of performing debugging or some other analysis. The method involves registering a user-customized filter function with the computer system's kernel, passing internal objects in the computer system in an active state through the filter-function, and capturing only internal objects from a single point in time satisfying the filter function.

DETAILED DESCRIPTION OF THE DISCLOSURE

Figure 1:
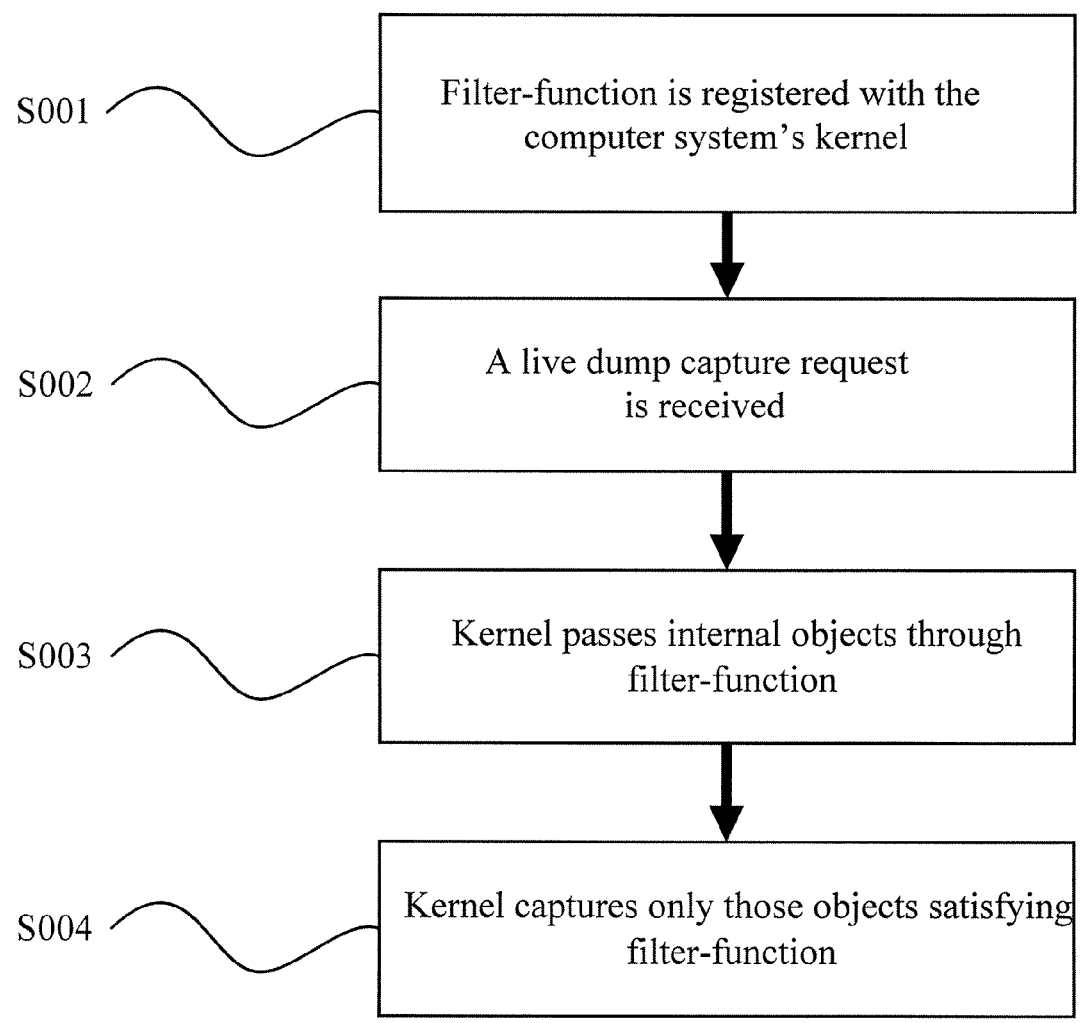
FIG. 1 is a flowchart illustrating the steps followed in performing a live dump capture of a computer system using a filter function.

By way of a simplified overview, this invention is directed to a method for performing a system capture of a large running computer system and capturing data from a single point in time in one pass without needing to reboot the system.

Initially at some point before a live dump is requested or performed, the filter function is loaded onto a kernel extension or some other form of dynamically loadable module, and the kernel extension is installed into the computer system's kernel. The kernel extension comprises a module capable of being loaded onto and unloaded from a running computer system without needing to reboot the computer system, and the kernel is programmed to capture internal objects in the computer system. In one embodiment, loading the filter function onto the kernel extension, or installing the kernel extension into the kernel may happen only once, each time a new filter is loaded or each time a live dump is initiated. In some cases, the kernel extension is installed into the kernel and based upon the user's preferences, multiple live dump captures can be performed without needing to reinstall the kernel extension. In addition, in some implementations, the kernel extension containing the installed filter function can be loaded onto and unloaded from a running computer system without needing to reboot the system.

Turning to the drawing, FIG. 1 is a flow chart illustrating the steps for capturing an active system with a filter function. The filer function instructs the kernel to capture only those categories of internal objects that are needed for a user's analysis. Because users capture internal objects from an active computer system with different desired analyses in mind, the user can tailor and modify the filter function to capture one or more different categories of internal objects to meet the needs of a specific analysis. Therefore, rather than reprogramming the kernel, which can be economically and temporally inefficient, the filter function itself can be reprogrammed to capture different categories of internal objects.

First, the filter-function, which has been tailored by the user to capture one or more categories of internal objects in a single serialized pass, is registered with a running computer system's kernel, (S001). Before this step, of course, the filter function has been installed into a kernel extension, and the kernel extension has itself been installed into the computer system's kernel.

The actual capture process begins when a live dump request is received (S002). The filter function has been registered with the kernel (S003). The kernel passes all internal objects in the running computer system through the filter function and captures only those internal objects satisfying the filter function (S004). Those objects that do not satisfy the filter function are not captured.

The filter function thus weeds out those objects that are not needed for the user's desired analysis and effectively instructs the kernel to capture only those objects that are needed. The filter function thus reduces the space and time required for the live dump capture so that it can occur in one serialized pass without exceeding the space constraints of the kernel's live dump facility. Because objects are not captured in multiple passes, inconsistencies between captured objects are avoided, and all captured objects are from a single point in time. Improved debugging and crash analysis is thus available to users because a live capture is performed in reduced time, without exceeding capture-storage capacities.

Internal objects are captured corresponding to a common point in time. In one embodiment, internal objects are captured regardless of whether they have completed processing and may potentially include one or more undefined or uninitialized values. In an alternative embodiment, the filter function can be programmed not to capture objects with unintialized values.

In an alternative embodiment, after the filter function has been installed into the kernel extension, and the kernel extension has been loaded into the kernel, without uninstalling the kernel extension from the kernel, the filter function can be programmed to redefine the category or categories of objects that will be captured in the event of a live dump request. In this instance, the kernel extension, or other form of dynamically loadable module, once loaded into the kernel, provides access to the filter function for a user to reconfigure the user-defined parameters of the filter function used to capture selected internal objects.

In an alternative embodiment, a plurality of filter functions are used to capture more than one category of internal objects. Thus, rather than modifying the filter function previously used to capture selected categories of objects during a live dump request, an additional filter function can be loaded into a kernel extension and loaded into the kernel to work in conjunction with the previously loaded filter function to capture more than one category of internal objects.

In an alternative embodiment, a plurality of filter functions can be simultaneously installed into one or more kernel extensions, which are then loaded into a computer system's kernel. Each of the respective filter functions will then be registered with the system's kernel before a live dump request. Upon such a request, the filter functions will work in conjunction with each other to capture more than one category of internal objects.

In an alternative embodiment, the user can additionally design a plurality of filter functions with user-designated priority weightings to instruct the kernel which categories of objects to capture in the event one or more filter functions instructs the kernel to capture a specified category, but other filters do not.

In an alternative embodiment, the computer system's kernel is not programmed to perform a live dump request, but live dump capture facilities are provided by software running on the computer system or other available services.

It will be appreciated by persons skilled in the art that the present disclosure is not limited to what has been particularly shown and described herein. Rather, the scope of the present disclosure is defined by the claims which follow. It should further be understood that the above description is only representative of illustrative examples of implementations suitable for use with the invention.

What is claimed is:

1. A method for capturing select internal objects from a computer system, comprising:
   registering a user-customized filter function with a kernel of the computer system,
   the filter function filtering one or more categories of internal objects in a single serialized pass,
   the filter function being installed into a kernel extension,
   the kernel extension including a module capable of being loaded onto and unloaded from a running computer system without needing to reboot the computer system,
   the kernel extension being configured to interact with the kernel of the computer system, and
   the kernel being programmed to capture internal objects in the computer system,
   passing internal objects in the computer system through the filter-function while the computer system is in an active state, and
   the single serialized pass that captures the internal objects that satisfy the filter function occurring at a common point in time.

* * * * *